D. F. HULL.
Fertilizing Attachment for Grain-Drills.
No. 215,748. Patented May 27, 1879.
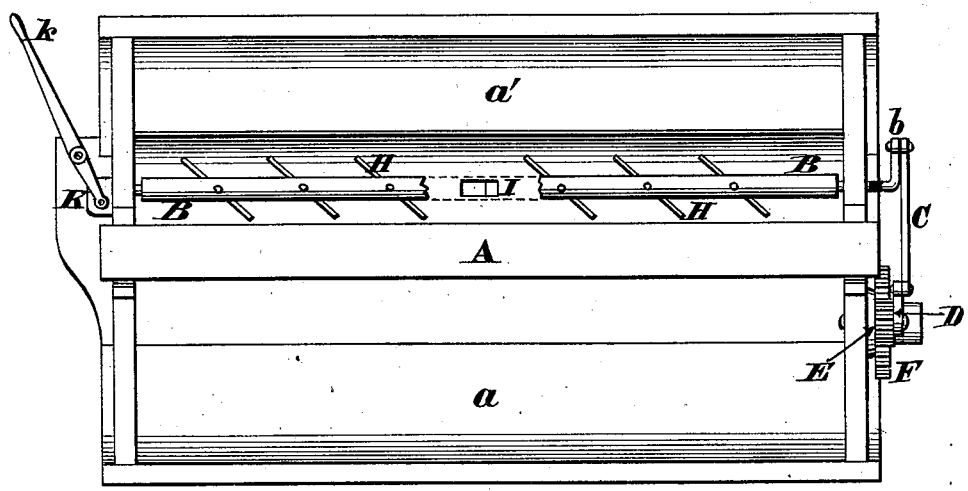
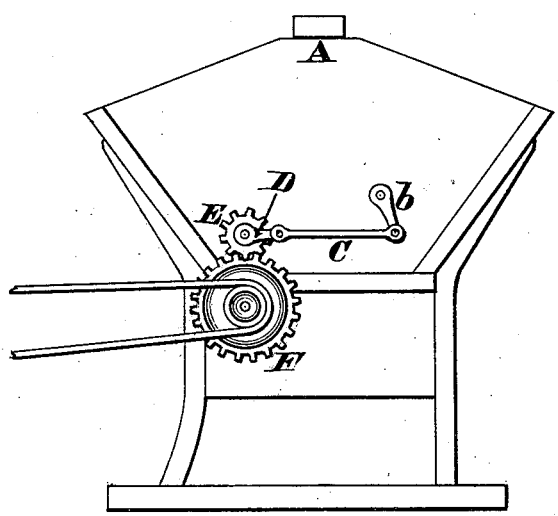
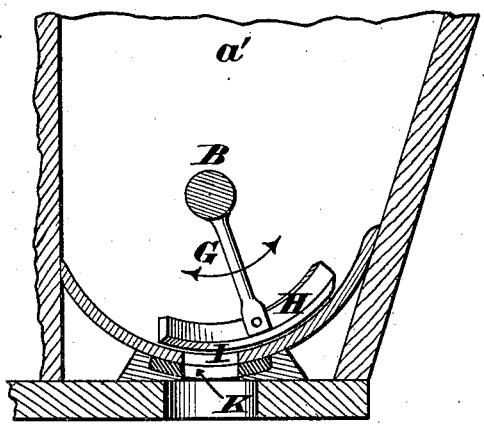
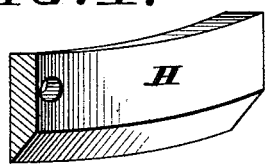
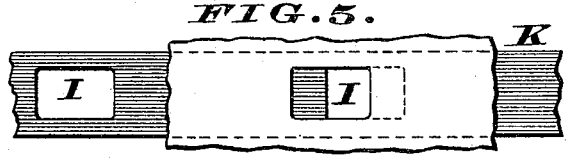
Attest:
Jeremiah F. Dunfrig.
John Kelly.
Inventor.
David F. Hull.
By John E. Hatch
his Atty

UNITED STATES PATENT OFFICE.

DAVIT F. HULL, OF HAGERSTOWN, MD., ASSIGNOR TO HAGERSTOWN AGRICULTURAL IMPLEMENT MANUFACTURING COMPANY, OF SAME PLACE.

IMPROVEMENT IN FERTILIZING ATTACHMENTS FOR GRAIN-DRILLS.

Specification forming part of Letters Patent No. 215,748, dated May 27, 1879; application filed January 31, 1879.

*To all whom it may concern:*

Be it known that I, DAVIT F. HULL, of Hagerstown, in the county of Washington and State of Maryland, have invented certain Improvements in Fertilizing Attachments for Grain-Drills, of which the following is a specification.

In the fertilizer attachments heretofore used in connection with grain-drills for sowing fertilizers, many devices have been adopted to agitate the fertilizer in its trough, so it will feed regularly through each of the holes.

Revolving cylinders with projections have been used; also, cylinders placed beneath the trough and at its side, having projections working in the fertilizer to agitate it, have been used. Vibrating scrapers working squarely across the feed-openings, oblique square-ended agitators working at some distance above openings in a flat hopper-bottom, and vibrating pointed agitators moving across the feed-openings have, I am aware, been proposed, and I lay no claim thereto, the peculiarity of my device consisting in the fact that it combines the three features of a sharp cutting-edge, a vibratory movement, and an oblique position in relation to the feed-openings. None of these have succeeded perfectly, as the fertilizer is very difficult to handle, owing to the fact that when damp it becomes embedded together, and by constant use of the fertilizer box or trough the fertilizer adheres to the bottom, and becomes very hard and compact against the bottom of the trough near the openings.

My invention consists more especially in arranging a knife-edged scraper over each hole, and so connecting it with the driving mechanism that it shall constantly cut across the curved bottom of the trough, and by the shearing action oblique to the opening cut clear any of the fertilizer that has a tendency to become embedded upon the bottom.

In the drawings, Figure 1 represents a plan view of the fertilizing attachment; Fig. 2, an end view, showing the mechanism for communicating movement. Fig. 3 is a section view of the trough and opening, and shows more exactly the peculiar action of the knife-edged cutter. Fig. 4 is an enlarged view of the knife-edged cutter or scraper. Fig. 5 is a view of the opening in the bottom of the trough, with a slide for increasing or decreasing the size of the opening.

In the drawings, A is the box of the fertilizer, in this case made with one side, *a*, for the receipt of the grain, and the other side, *a'*, for the receipt of the fertilizer. B is the cylinder or shaft whereby motion is communicated to the cutters. This shaft runs longitudinally through the trough, and rocking motion is communicated to it by the crank-shaft *b* and lever C, which lever is moved by the crank D on the small pinion E, which meshes into the drive-wheel F, which again is driven by the supporting drive-wheels of the machine.

Of course any different method of imparting a rocking motion to the shaft may be employed.

G represents round pins or standards projecting downward from the rocking shaft B, and in the drawings I have shown one over each of the feeding-holes in the bottom of the trough. To these are attached the knife-edged cutters H.

It will be observed that the bottom of the box is concave, and the edge of these knife-edged cutters is sufficiently convex so that when the shaft B is reciprocated the edge of the cutter H will at all points coincide very closely indeed with the bottom of the trough. These cutters H are secured to the pins or standards G so as to move across the feed-holes I at an angle ordinarily of about forty-five degrees, the holes I being, as here shown, rectangular, and increased or decreased in size by moving the slide K by means of the lever *k*. The object of this angular motion is so that the knife-edge shall shear across the opening in such way as to clear off any of the fertilizer that becomes attached to the bottom.

Having thus fully described my new and improved fertilizing attachment, what I claim as new, and desire to secure by Letters Patent, is—

1. The combination of the concave hopper-bottom provided with feed-openings and the vibratory scraper, arranged obliquely with reference to the openings, and constructed with the knife-edge, as shown and described.

2. The combination of a concave hopper provided with a series of discharge-openings and a rock-shaft, B, provided with a series of oblique knife-edged scrapers, H, arranged to move across the respective openings in close contact with the hopper.

DAVIT F. HULL.

Witnesses:
  WILLIAM H. WEST,
  CHRISTIAN G. BREZLER.